No. 721,700. PATENTED MAR. 3, 1903.
J. J. HARTNEY.
BALL BEARING AXLE.
APPLICATION FILED MAY 28, 1902.
NO MODEL.
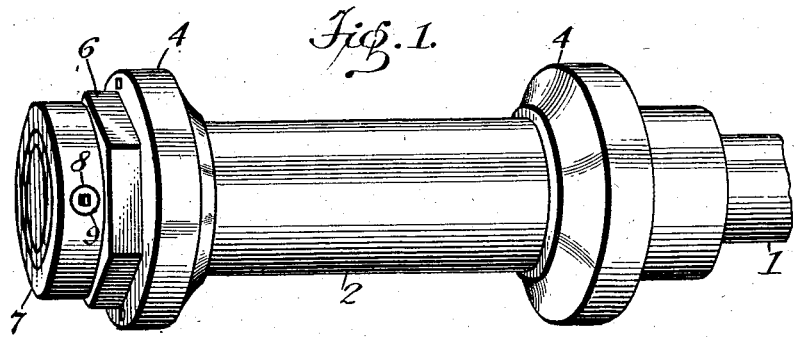
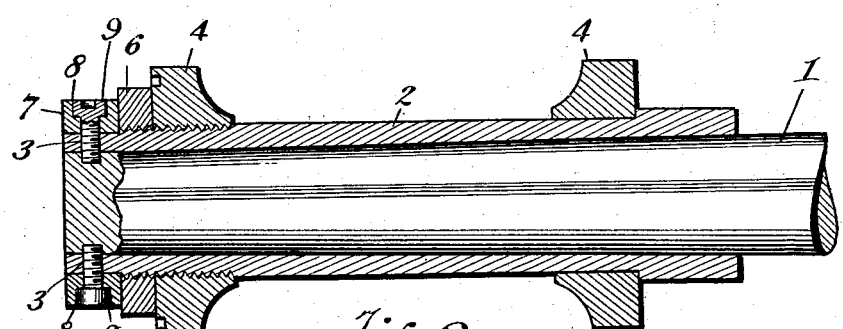
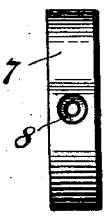
WITNESSES: INVENTOR
John J. Hartney,
BY
ATTORNEY.

UNITED STATES PATENT OFFICE.

JOHN J. HARTNEY, OF COLLINSVILLE, CONNECTICUT.

BALL-BEARING AXLE.

SPECIFICATION forming part of Letters Patent No. 721,700, dated March 3, 1903

Application filed May 28, 1902. Serial No. 109,361. (No model.)

*To all whom it may concern:*

Be it known that I, JOHN J. HARTNEY, a citizen of the United States, residing at Collinsville, in the county of Hartford and State of Connecticut, have invented certain new and useful Improvements in Ball-Bearing Axles, of which the following is a specification.

This invention relates to ball-bearing axles, and has for its object to provide a device by means of which the balls may be readily inserted and removed in the case of large or heavy axles, such as those used in cars, trucks, automobiles, and like vehicles.

Another object of the invention is to provide a device of the class described which can be readily slipped upon the end of such an axle and as easily removed therefrom.

In the drawings, Figure 1 is a perspective view of one end of an axle embodying my improvement, the wheel being removed therefrom. Fig. 2 is a longitudinal vertical sectional view of the same. Fig. 3 is a side elevation of the ring for securing the device upon an axle.

Corresponding parts in all the figures are denoted by the same reference characters.

Referring to the drawings, 1 designates an axle of the ordinary type used for automobiles, and 2 a hollow sleeve adapted to slide upon the end of the axle 1 and provided near its outer end with a series of apertures 3, for a purpose to be hereinafter explained. Cones 4 of the usual form of construction are provided upon their opposing faces with ball-races and adapted to be secured upon the sleeve 2 in suitable positions. Preferably the inner cone 4 rests against a shoulder formed upon the exterior surface of the sleeve 2, adjacent to the end opposite the end provided with the apertures 3, and may be fastened thereon in any approved manner. The sleeve 2 is preferably exteriorly threaded adjacent to the end having the apertures 3, and the outer cone 4 is interiorly screw-threaded complementarily to the threads upon the sleeve 2. The outer cone 4 is provided with means for screwing it into position, which means in the form shown consist in square sockets sunk in its outer face to receive a spanner. A nut 6 is provided to be screwed on the sleeve 2 outside of the outer cone 4 to lock the said cone 4 against movement, and a ring 7, provided with apertures 8, complementary to the apertures 3 in the sleeve 2, is adapted to fit on the end of the sleeve 2, the apertures 8 and the apertures 3 registering. Bolts 9, having flat heads and adapted to be inserted through the apertures 8 and apertures 3, are screwed into threaded apertures in the axle 1 near its outer end. The orifices of the apertures 8 in the outer surface of the ring 7 are countersunk to permit the heads of the bolts 9 to be sunk flush with the surface of the ring 7. The bolts 9 have square sockets in their heads for the purpose of inserting the end of a tool to screw them into place.

In assembling the parts of my invention the inner cone 4 is first slipped over the sleeve 2 until it abuts against the shoulder formed on said sleeve. The wheel is then laid flat on its outer side and the sleeve 2 inserted through the hub, the inner cone 4 being supported at a distance from the inner end of the hub of the wheel until the balls can be inserted in the race on the inner cone of the wheel-hub. Then the sleeve 2 is pushed through the wheel-hub until the inner cone 4 contacts with the balls in the race formed on the inner cone of the wheel-hub. The wheel is now lifted up and rested upon the inner end of the sleeve 2 and the balls inserted in the race on the outer cone of the wheel-hub. The outer cone 4 is now screwed upon the sleeve 2 until the adjustment of the cones and balls is satisfactory, when the locknut 6 is screwed up against the outer face of the outer cone 4. The sleeve 2 is now slipped upon the end of the axle 1 and the ring 7 placed over the end of the sleeve 2, so that the apertures 8 and 3 will register when the bolts 9 are inserted and screwed home, securing the sleeve 2 firmly upon the end of the axle 1. The mounting of the wheel is now complete and ready for operation. To dismount the wheel, the operation is simply reversed.

The operation and advantages of my invention will be readily understood and appreciated. With heavy wheels and axles it is almost impossible to follow the method of mounting the wheel upon the ball-bearing axle employed with lighter vehicles, and hence I have provided a device which does away with the difficulties of mounting the ball-bearing wheel and which may be fastened rigidly without difficulty upon the end of an axle, no matter how heavy. The wheel is first mounted upon the hollow sleeve 2 in the same manner substantially as would be done with an ordinary bicycle, and after the ball-bearing connections have all been made the sleeve is simply slipped over the end of the axle 1 and secured thereon by the bolts 9. It is as though the skein in an ordinary hub was secured firmly on the axle-spindle while the ball-bearing was between the skein and the wheel-hub.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variation and modification as properly fall within the scope of my invention and the terms of the following claim.

Having thus described my invention, I claim and desire to secure by Letters Patent—

A device of the class described, consisting of the following elements in combination, viz: a sleeve adapted to fit over an axle, said sleeve having an external shoulder formed upon it near one end, and screw-threaded exteriorly a short distance from the opposite end, a cone provided with a ball-race securely carried by said sleeve and abutting against said shoulder, a cone having a ball-race facing toward the ball-race in the first-named cone and interiorly screw-threaded complementary to the screw-threads upon the sleeve, a locking-nut adapted to abut against the outer face of the screw-threaded cone, a ring adapted to fit over the sleeve and abut against the locking-nut, and bolts securing the ring and the sleeve and the axle together, substantially as set forth.

In testimony whereof I have signed my name in the presence of the subscribing witnesses.

JOHN J. HARTNEY.

Witnesses:
J. H. BIDWELL,
M. E. MITCHELL.